United States Patent [19]

Gockel et al.

[11] Patent Number: 4,524,095

[45] Date of Patent: Jun. 18, 1985

[54] LAMINATE INCLUDING AN ADHESIVE-COATED SUBSTRATE AND A REMOVABLE COVER LAYER HAVING MEANS TO FORM GRASP PARTS UPON BENDING

[75] Inventors: Karl-Heinz Gockel, Solingen-Gräfrath; Dieter Anhäuser, Melsbach; Hans R. Hoffmann, Neuwied; Karl-Heinz Reinhold, Hausen, all of Fed. Rep. of Germany

[73] Assignees: Lohmann GmbH & Co. KG; Sanol Schwarz GmbH, both of Fed. Rep. of Germany

[21] Appl. No.: 541,143

[22] Filed: Oct. 12, 1983

[30] Foreign Application Priority Data

Apr. 27, 1983 [DE] Fed. Rep. of Germany ....... 3315271

[51] Int. Cl.³ .......................... B32B 3/10; B32B 3/00

[52] U.S. Cl. ........................................ 428/43; 428/40; 428/138

[58] Field of Search ..................... 428/40, 41, 43, 138, 428/343, 354

[56] References Cited

U.S. PATENT DOCUMENTS 3,230,649 1/1966 Karn ..................................... 428/40
3,639,500 2/1972 Muny et al. ........................... 428/40
3,690,999 9/1972 Setzer .................................. 428/40
3,764,447 10/1973 Duff ..................................... 428/43
3,987,569 10/1976 Chase ................................... 428/41
4,397,261 8/1983 Jones .................................... 428/40

FOREIGN PATENT DOCUMENTS 2084509 4/1982 United Kingdom ................. 428/41

*Primary Examiner*—Paul J. Thibodeau
*Attorney, Agent, or Firm*—Kerkam, Stowell, Kondracki & Clarke

[57] ABSTRACT

The present invention is related to a flat laminate part consisting of a substrate layer and a cover layer the adhesive compounding between said substrate layer and said cover layer being such that both layers are securely held together, but a pull-off of said cover layer from said substrate layer is readily possible by hand or mechanically, said flat laminate part having additionally an auxiliary pull-off means to so pull-off said cover layer or parts of said cover layer by hand or mechanically along preset cuts or, respectively, preset breaking lines in said cover layer, wherein said preset cuts or preset breaking lines in said cover layer are positioned and formed such that there is at least one part of the cover layer which can be grasped per each part of said cover layer to be pulled off, said grasp part is, getting exposed by bending the flat laminate part getting exposed by bending the flat laminate part to form a concave curvature of the surface of said cover layer opposite to the surface of said cover layer adhearing to said substrate layer and that the two points of attack of the force producing such bending of the flat laiminate part are distributed over the surface of the flat laminate part such that the hand produced or mechanical pull-off forces acting substantially vertically to the laminate result in a peeling off of said grasp part of said cover layer.

10 Claims, 6 Drawing Figures

LAMINATE INCLUDING AN ADHESIVE-COATED SUBSTRATE AND A REMOVABLE COVER LAYER HAVING MEANS TO FORM GRASP PARTS UPON BENDING

The present invention is related to flat laminate parts consisting of a substrate layer and a cover layer having additionally an auxiliary pull-off means for the cover layer or parts thereof.

It is often necessary to protect one or both surfaces of a flat substrate or one or both open surfaces of a flat laminate, by a cover layer before the final use thereof. Such a cover layer is necessary for instance due to the adhesive properties of this surface or its sensitivity to mechanical damage or in order to avoid evaporation of highly volatile components from a layer by way of such a surface. The cover layer in general is kept to the substrate layer by adhesive additions to the surface layer or by the self-adhesive properties of the surface of the substrate layer which adhesive forces may be overcome by the application of mechanical pull-off forces. The problem with such compositions is to make the combination of the substrate layer and the cover layer such that both layers are securely held together but the pull-off of the cover layer or of parts thereof is easy and readily possible.

There are known already several propositions to solve this problem. Thus, a mere tearing of the laminate allows to use the finger nail to grasp a part of the cover layer and pull it off from the substrate layer and by using this part of the cover layer as grasp part to thereby allow a complete pull-off of the cover layer. It is furthermore known to compose the cover layer of several parts with a total surface larger than the surface of the substrate layer thereby producing overlapping parts in the surface of the cover layer which overlapping parts are used as grasp parts and auxiliary pull-off means in the cover layer. If no such overlapping parts are provided in the cover layer, grasp parts in the cover layer are known to be produced by sharply bending the laminate at one or several of its edges thereby causing the cover layer to be solved from the substrate layer at such edges if the cover layer is rigid enough to produce sufficient pull-off forces by such rigidity. Another known possibility to produce grasp parts for the cover layer is to cover the substrate layer by a cover layer larger than the substrate layer, for example as is shown in Setzer U.S. Pat. No. 3,690,999. Furthermore, another known means to ease the pull-off of the cover layer from the substrate layer is to produce linear cuts or preset linear breaking lines in the cover layer allowing to produce lines in the cover layer by pulling and bending the laminate wherefrom the pull-off of the cover layer may be started for example as is shown in Karn U.S. Pat. No. 3,230,649. Still furthermore, it is known to incorporate into the laminate a wire or a strap between the cover layer and the substrate layer said wire or strap projecting over the edges of the laminate which wire or strap serves as an auxiliary pull-off means for the cover layer from the substrate layer.

All these proposals to solve the problem are not satisfactory because they either necessitate additional material or complicated procedures to produce them or do not give a sufficient large grasp part to easily pull-off the cover layer from the adhering substrate layer.

It is therefore an object of the present invention to provide an embodiment for an auxiliarly pull-off means for the cover layer or parts thereof in such flat laminate parts which are easy to produce and allow a ready and safe pull-off from the cover layer and avoid the above mentioned disadvantages. The flat laminate part according to the present invention consists of a substrate layer and a cover layer on both surfaces of the substrate layer or, preferably, on one side thereof, the adhesive compounding between the substrate layer or the cover layer or layers being such that both the substrate layer and the cover layer or layers are securely held together, but a pull-off of the cover layer or layers from the substrate layer is readily possible by hand or mechanically, i.e. the adhesiveness between the surface or surfaces of the substrate layer and the cover layer or layers covering said substrate layer is such that the cover layer or layers securely stick to the substrate layer and at the same time may be pulled off readily by the application of limited mechanical forces, for instance by holding the laminate part in the one hand and grasping the cover layer with the other hand or by using usual pull-off machines. The flat laminate part according to the present invention additionally has an auxiliary pull-off means to so pull-off the cover layer or parts of the cover layer mechanically along cuts or preset breaking lines in the cover layer or layers. In accordance with the present invention, the preset cuts or preset breaking lines are particularly positioned and formed such that there is at least one part of the cover layer which can be grasped, for each part of the cover layer to be pulled off, which part is getting exposed by bending the flat laminate part to form a concave curvature of the surface of the flat laminate cover opposite to the surface of the cover layer adhearing to the substrate layer and that the at least two points of attack of the force producing such bending of the flat laminate part are distributed over the surface of the flat laminate part such that the mechanical forces acting substantially vertically to the laminate result in a peeling off of the grasp parts of the cover layer.

The invention is further illustrated by means of the attached drawings without however limiting the same thereto.

Figure 1:
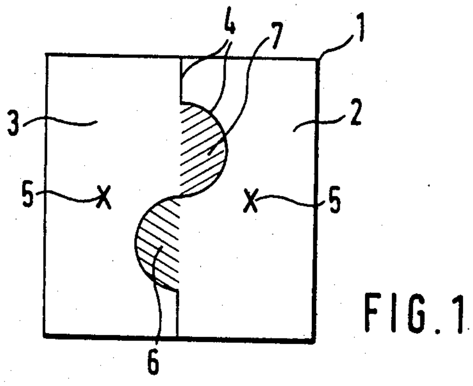
FIG. 1 shows a top view of the cover layer of a quadrangular part of the flat laminate according to the present invention.
Figure 2:
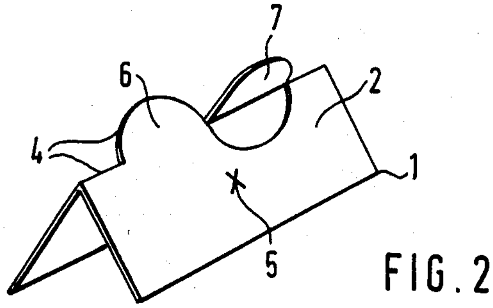
FIG. 2 shows a perspective view of the bent laminate part of FIG. 1.

In FIG. 1, (1) is the quadrangular laminate part as such. The cover layer of this laminate part is subdivided by the preset cut or preset breaking line (4) into two partial surface areas (2) and (3). The preset cut or preset breaking line (4) runs from one edge of the laminate part to the opposite edge thereof and partially has the form of a sinusoid (sine curve). This sine curve defines the hatched or shaded surface area (6) as grasp or pick-up part for the partial surface area (2) of the cover layer and the hatched area (7) as grasp part of the partial surface area (3) of the cover layer. The crosses (5) characterize those areas, wherein the forces producing the bending of the laminate part and thereby producing the exposition of the grasp parts (6) and (7), are to be applied. A perspective illustration of the bent quadrangular laminate part is given in FIG. 2. The numbers contained therein have the same meaning as in FIG. 1. The exposed grasp parts (6) and (7) are readily recognizable and show that the pull-off of the surface areas (2) and (3) by hand or mechanically is readily possible.

Figure 3:
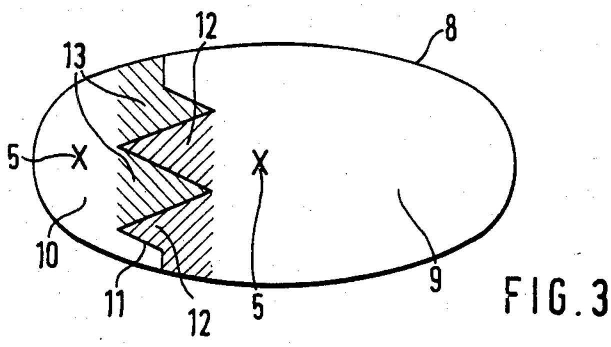
FIGS. 3 to 6 show the top views of the cover layer of other embodiments of the flat laminate part according to the present invention.

FIG. 3 shows an oval-shaped embodiment (8) of a laminate part according to the present invention. The cover layer thereof is subdivided asymmetrically by a preset cut or preset breaking line (11) in the partial surface areas (9) and (10) different in surface area from each other. The preset cut or preset breaking line (11) connects two opposite positions at the edge of the oval and is zigzag formed and produces the hatched surface area (12) as grasp part for the partial surface area (9) and the hatched area (13) as grasp part for the partial surface area (12). The zigzag form actually shown in FIG. 3 may be course also be a mirror inversion which is true for many preset cut or, respectively, preset breaking line embodiments shown in the present Figures. If bending forces in FIG. 3 attack in the areas defined with crosses (5), the grasp parts (12) and (13) are exposed and the partial or complete pull-off of the cover layer is readily possible.

Figure 4:
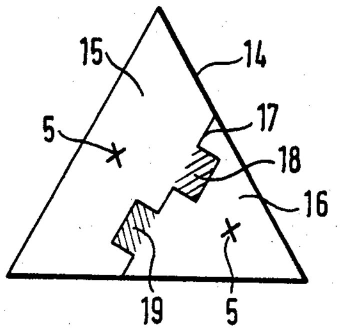

A triangular-shaped embodiment (14) of the laminate part according to the present invention is shown in FIG. 4. In this embodiment the preset cut or, respectively, breaking line (17) runs from one edge of the triangular to one of the other edges thus subdividing the surface of the cover layer into the partial surface areas (15) and (16) different in surface size. The grasp parts (18) and (19) of this embodiment have a rectangular shape and become exposed upon the application of bending forces in the areas (5). The partial or complete pull-off of the cover layer may then occur by hand or mechanically.

Figure 5:
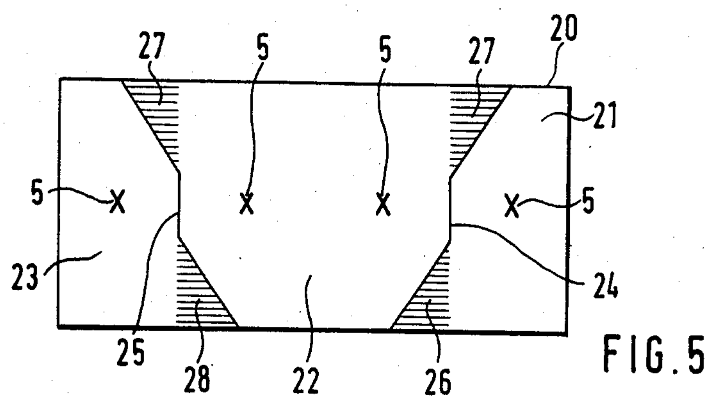

A further embodiment of the present invention is shown in FIG. 5. In this embodiment two preset cuts or breaking lines subdivide the surface of the cover layer of the laminate part (20) in three partial surface areas (21), (22) and (23). The preset cuts or breaking lines run from one of the longer edges of the rectangular shape to the other long side. The preset cuts or preset breaking lines are shaped angled such that the triangular grasp part (26) for the one outer surface area part (21), the triangular grasp part (27) for the middle partial area (22) and the grasp part (28) for the other outer partial surface area (23) is formed. The exposition of these grasp parts occurs after allowing bending forces to attack in the areas indicated with (5). The exposed grasp parts (26), (27) and (28) readily allow the partial or complete pull-off of the cover layer.

Figure 6:
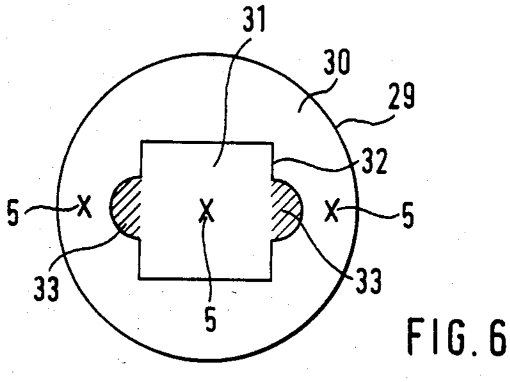

The circular or round embodiment (29) of the laminate part according to the present invention as shown in FIG. 6 has the particularity that the preset cut or preset breaking line 32 is a closed line, has the geometrical form substantially of an equilateral square and does not touch any edge of this embodiment of the laminate part. In order to pull off that partial surface area (31) embraced by the preset cut or breaking line partially from the cover layer allowing to leave the partial surface area (30), the preset substantially equilaterally quadrangular cut or breaking line has two convexities at two opposite edges of the equilateral square projecting into the partial surface areas (39). These convexities (33) represent the grasp parts and may be exposed by the application of bending forces in the areas (5). The partial surface area (31) has two grasp parts (33) and thereby may be readily pulled off.

The Examples illustrated in the present drawings indicate that the present invention may have many various embodiments and is only limited by the definitions given in the following claims. Thus, a prerequisite of the present invention is that the cover layer is subdivided by the preset cuts or preset breaking lines in at least two partial surface areas. The preset cuts or breaking lines connect two points at the edge of the laminate part or form closed geometrical figures which do not touch any edge of the laminate part. The latter embodiment is in particular useful in connection with the pull-off of partial surface areas positioned within the total surface area.

The cover layer and/or the substrate layer may be composed of one or a multitude of individual layers. The raw materials used for the production of the substrate layer have to be flexible while they may be such for the cover layer to render it flexible or rigid. The partial or complete pull-off of the cover layer exposes the second surface of the substrate or parts thereof in order to allow the further use thereof or of the substrate. In a preferred embodiment, this surface of the substrate is finished with an adhesive thus allowing to fix the substrate to a suitable area after removal of the cover layer or parts thereof. The outer edge or contour of the laminate part may be varied and depends upon the necessities of the intended use thereof. The substrate may also have a cover layer on both of its surfaces. In accordance with the present invention, in this embodiment there may be provided preset cuts or preset breaking lines in both cover layers which allow the removal of one or both cover layers simultaniously or at differing times.

The preset cuts or preset breaking lines in the cover layer may be produced by methods known to the expert in the art, for instance by punching, cutting, pressing, squeezing, or stamping while the preset breaking lines are preferably producing by perforation, local chemical treatment or by the application of pull-off wires.

What we claim is:

1. A flat laminate part comprising:

a flexible substrate layer having at least one surface;

a cover layer at least partially on the one surface of said substrate layer;

means for effecting adhesion of said cover layer to said surface of the substrate layer in the area of said cover layer such that the layers are securely held together but may be pulled apart;

a continuous cut in said cover layer from one edge to another edge of said cover layer thereby separating the cover layer into two parts, at least parts of said cut respectively diverting substantially from a straight connection line between the end points of the cut at the edges of the cover layer into each part of said cover layer;

the flexibility of said cover layer and the adhesion between said substrate layer and said cover layer being such that, upon bending of the flat laminate part substantially along said straight connection line between the end points of said cut at the edges of said cover layer in a direction which produces a convex curvature of the exposed surface convexly on the side of the cover layer, said diverting parts of said cut line into each part of the cover layer are separated and peeled off from the substrate layer to form thereby a grasp part for each cover layer part.

2. A flat laminate part in accordance with claim 1, comprising a plurality of such continuous cuts in said cover layer each from one edge to another edge of the cover layer thereby separating the cover layer into a number of parts corresponding to the number of cuts plus one.

3. A flat laminate part in accordance with claim 1, wherein the continuous cut in the cover layer is from one edge to the opposite edge of said cover layer.

4. A flat laminate part in accordance with claim 2, wherein the continuous cuts in the cover layer are from one edge to the opposite edge of said cover layer.

5. A flat laminate part in accordance with claim 1, wherein at least one of said cover and substrate layers in turn comprises plurality of layers.

6. A flat laminate part in accordance with claim 3, wherein at least one of said cover and substrate layers in turn comprises a plurality of layers.

7. A flat laminate part in accordance with claim 4, wherein at least one of said cover and substrate layers in turn comprises a plurality of layers.

8. A flat laminate part in accordance with claim 1, which further comprises:

a second cover layer on a second surface of said substrate layer opposite to the surface with the first cover layer;

means for effecting adhesion of said second cover layer to said opposite surface of the substrate layer in the area of said second cover layer such that the layers are securely held together but may be pulled apart;

a continuous cut in said second cover layer from edge to another edge of said second cover layer separating said second cover layer into two parts, at least parts of said cut in said second cover layer respectively diverting substantially from a straight connection line between the end points of the cut at the edges of said second cover layer into each part of said second cover layer;

the flexibility of said second cover layer and the adhesion between said substrate layer and said second cover layer being such that, upon bending of the flat laminate part substantially along said straight connection line between the end points of said cut at the edges of said second cover in a direction which produces a convex curvature of the exposed surface of said second cover layer, said diverting parts of said cut line into each part of the second cover layer are separated and peeled off from the substrate layer to form thereby a grasp part for each of said second cover layer parts.

9. A flat laminate part comprising:

a flexible substrate having at least one surface;

a cover layer at least partially on the one surface of said substrate layer;

means for effecting adhesion of said cover layer to said surface of the substrate layer in the area of said cover layer such that the layers are securely held together but may be pulled apart;

a continuous or substantially continuous cut in said cover layer representing a closed geometrical form not touching any edge of said cover layer;

the flexibility of said cover layer and the adhesion between said substrate layer and said cover layer being such, that upon bending of the flat laminate part substantially along a side of the closed geometrical form in a direction which produces a convex curvature of the exposed surface of the cover layer, the closed form or part thereof is separated and peeled off from the substrate layer to form thereby a grasp part for the closed geometrical form in the cover layer.

10. A flat laminate part in accordance with claim 9, wherein at least one of said cover and substrate layers in turn comprise a plurality of layers.

* * * * *